(12) United States Patent
Pearce et al.

(10) Patent No.: US 6,847,634 B1
(45) Date of Patent: Jan. 25, 2005

(54) SYSTEM AND METHOD FOR DISTRIBUTED CALL ROUTING

(75) Inventors: Christopher E. Pearce, Dallas, TX (US); Roger V. Beathard, McKinney, TX (US); Delon R. Whetten, Allen, TX (US); Scott A. Henning, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/579,330

(22) Filed: May 25, 2000

(51) Int. Cl.$^7$ ................................................ H04L 12/66
(52) U.S. Cl. ............................................ 370/352; 370/396
(58) Field of Search ........................... 370/352, 353, 370/355, 356, 389, 392, 395.2, 400, 401, 493, 396

(56) References Cited

U.S. PATENT DOCUMENTS

| | | | | |
|---|---|---|---|---|
| 5,652,866 | A | 7/1997 | Aldred et al. | 395/500 |
| 5,790,647 | A | 8/1998 | Gessel | 379/201 |
| 6,205,214 | B1 | 3/2001 | Culli et al. | 379/220 |
| 6,259,779 | B1 | 7/2001 | Council et al. | 379/121 |
| 6,282,194 | B1 * | 8/2001 | Cheesman et al. | 370/356 |
| 6,304,574 | B1 | 10/2001 | Schoo et al. | 370/401 |
| 6,304,576 | B1 | 10/2001 | Corley et al. | 370/408 |
| 6,353,610 | B1 * | 3/2002 | Bhattacharya et al. | 370/352 |
| 6,363,065 | B1 * | 3/2002 | Thornton et al. | 370/352 |
| 6,389,130 | B1 * | 5/2002 | Shenoda et al. | 370/352 |
| 6,522,732 | B1 * | 2/2003 | Pullen et al. | 379/112.02 |
| 6,560,326 | B1 | 5/2003 | Clark | 379/221.09 |
| 6,570,855 | B1 * | 5/2003 | Kung et al. | 370/354 |
| 6,584,093 | B1 | 6/2003 | Salama et al. | 370/351 |
| 6,597,687 | B1 * | 7/2003 | Rao | 370/352 |
| 6,614,902 | B1 | 9/2003 | Rizzetto | 379/265.11 |
| 6,657,989 | B1 | 12/2003 | Hilsenrath | 370/351 |
| 2002/0150080 | A1 * | 10/2002 | Bhattacharya et al. | 370/351 |

OTHER PUBLICATIONS

Cisco Systems, Inc.; "System Description for the Cisco Communications Network Version 2.1;" Cisco Communications Network; all, 1997.

* cited by examiner

*Primary Examiner*—Kwang Bin Yao
*Assistant Examiner*—Anh-Vu H Ly
(74) *Attorney, Agent, or Firm*—Baker Botts L.L.P.

(57) ABSTRACT

A call manager includes a device process that controls a first device and that receives a call request from the first device. The call request includes a telephone number associated with a second device that is controlled by a second call manager. The call manager also includes a digit analysis module that determines device location information associated with the telephone number included in the call request. Furthermore, the call manager includes a call control module operable to receive the device location information from the digit analysis module and to communicate the call request to the second call manager identified by the device location information.

48 Claims, 3 Drawing Sheets

110

| DIGIT STRING | PID |
|---|---|
| 1001 | 1.dp.1 |
| 1005 | 1.dp.2 |
| 2008 | 1.dp.3 |
| 9@ | 1.dp.4 |
| XXX-XXXX | 1.dp.4 |
| XXX-XXX-XXXX | 1.dp.4 |
| 1002 | 2.dp.1 |
| 2001 | 2.dp.2 |
| 2002 | 2.dp.3 |

112   114

| DIGIT STRING | PID |
|---|---|
| 1001 | 1.dp.1 |
| 1005 | 1.dp.2 |
| 2008 | 1.dp.3 |
| 9@ | 1.dp.4 |
| XXX-XXXX | 1.dp.4 |
| XXX-XXX-XXXX | 1.dp.4 |
| 1002 | 2.dp.1 |
| 2001 | 2.dp.2 |
| 2002 | 2.dp.3 |

112  114

SYSTEM AND METHOD FOR DISTRIBUTED CALL ROUTING

CROSS-REFERENCE TO RELATED APPLICATIONS

This application is filed concurrently with the following commonly-owned applications:
SYSTEM AND METHOD FOR DEVICE REGISTRATION REPLICATION IN A COMMUNICATION NETWORK, Attorney Docket 062891.0405;
SYSTEM AND METHOD FOR ROUTING CALLS ACROSS CALL MANAGERS USING A ROUTE PLAN, Attorney Docket 062891.0406;
SYSTEM AND METHOD FOR PROVIDING SHARED LINE APPEARANCES IN A DISTRIBUTED CALL ROUTING, Attorney Docket 062891.0407; and
SYSTEM AND METHOD FOR ROUTING CALLS USING DIALING PARTITIONS, Attorney Docket 062891.0408.

TECHNICAL FIELD OF THE INVENTION

This invention relates generally to the field of telecommunications, and more specifically to a system and method for distributed call routing.

BACKGROUND OF THE INVENTION

Historically, telecommunications have involved the transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a local area network (LAN) or a wide area network (WAN). Currently, telecommunications and data transmissions are being merged into an integrated communication network using technologies such as Voice over Packet (VoP). Since many LANs and WANs transmit computer data using packet protocols, such as the Internet Protocol (IP), VoP uses this existing technology to transmit voice and fax signals by converting these signals into digital data and encapsulating the data for transmission over a packet-based network.

SUMMARY OF THE INVENTION

In accordance with the present invention, a system and method for distributed call routing is provided that substantially eliminates or reduces disadvantages or problems associated with previously developed systems and methods. In particular, the present invention contemplates a system and method for routing calls between devices coupled to a packet-based network and controlled by different call managers.

In one embodiment of the present invention, a call manager includes a device process that controls a first device and that receives a call request from the first device. The call request includes a telephone number associated with a second device that is controlled by a second call manager. The call manager also includes a digit analysis module that determines device location information associated with the telephone number included in the call request. Furthermore, the call manager includes a call control module operable to receive the device location information from the digit analysis module and to communicate the call request to the second call manager identified by the device location information.

In another embodiment of the present invention, a method for distributed call routing includes receiving a call request at a first call manager from a first device that is coupled to a packet-based network. The call request includes a telephone number associated with a second device that is coupled to the packet-based network and controlled by a second call manager. The method also includes determining by the first call manager that the second device is controlled by the second call manager. The method further includes communicating the call request to the second call manager and receiving a call proceed signal from the second call manager.

Technical advantages of the present invention include a system and method for routing calls that allow the control of a number of devices in a communication network to be distributed between a number of call managers. Each call manager maintains registration information associated with each of the devices in the communication network. Therefore, if a device controlled by a first call manager wishes to communicate with a device controlled by a second call manager, the first call manager will know to send the call request to the second call manager.

The present invention also provides for the use of device processes in each call manager to control the devices. Each device process is associated with a particular device and executes in the call manager controlling that device. Each device process provides an addressable destination for communication of call requests from a call manager to the device associated with the device process. A call manager may directly communicate with a device processes executing in another call manager using direct inter-process signaling. The location of a device process may be stored at each call manager to provide the call managers with the destination for call requests to the associated device, and the location may be periodically updated to reflect a change in the location of the associated device or a change in the call manager controlling the device.

By providing the ability to route calls between call managers, the present invention enables a dynamic communication network where devices can be controlled by any call manager and where devices can seamlessly move their registration between call managers without affecting the ability of the call managers to route calls to the devices.

Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
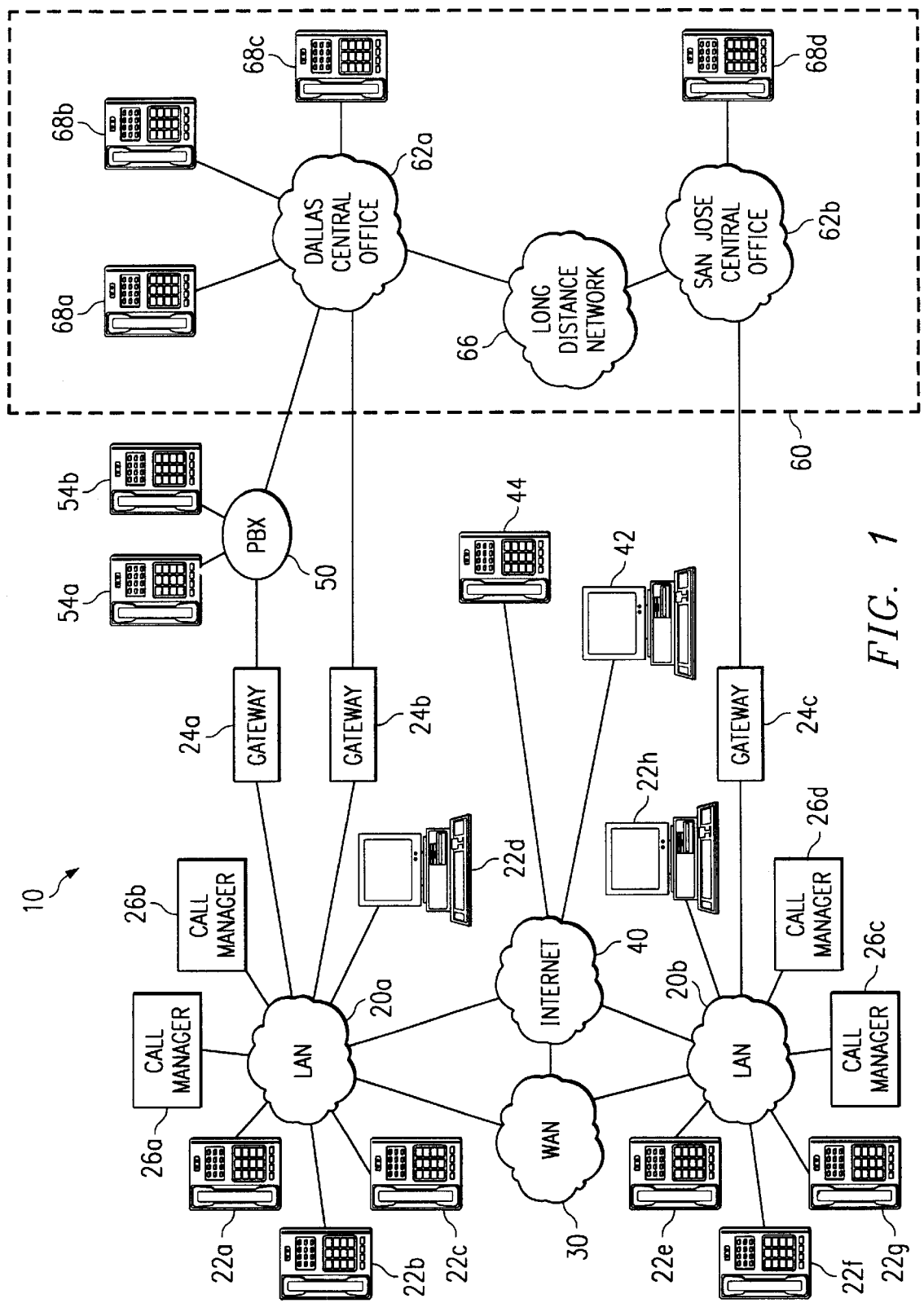
FIG. 1 illustrates an exemplary communication network in accordance with one embodiment of the present invention.

FIG. 1 illustrates an exemplary communication network 10. Although a specific communication network is illustrated in FIG. 1, the term "communication network" should be interpreted as generically defining any network capable of transmitting telecommunication signals, data, and/or messages. In the illustrated embodiment, communication network 10 includes a plurality of local area networks (LANs) 20 interconnected using a wide area network (WAN) 30. Each LAN 20 is a computer data network that is further operable to transmit audio and/or video telecommunication signals. In a particular embodiment, LANs 20 are Internet Protocol (IP) networks. However, LANs 20 may be any type of network that allows the transmission of audio and video telecommunication signals and data, as well as traditional data communications. Therefore, although subsequent description will primarily focus on IP communications, it should be understood that other appropriate method of transmitting telecommunications over a data network, such as a Frame Relay, ATM, or other packet-based network, are also included within the scope of the present invention.

LANs 20 may be directly coupled to other IP networks including, but not limited to, WAN 30 and any IP networks coupled to WAN 30 (such as other LANs 20 or the Internet 40). Since all IP networks share a common method of transmitting data, telecommunication signals may be transmitted between telephony devices located on different, but interconnected, IP networks. In addition to being coupled to other IP networks, LANs 20 may also be coupled to non-IP telecommunication networks through the use of gateway devices 24. For example, LAN 20a is coupled to a private branch exchange (PBX) 50 through a gateway device 24a. PBX 50 includes a plurality of extension telephones or subscriber sets 54a and 54b to which PBX 50 directs incoming telephone calls. Gateway device 24a may be either an analog or a digital gateway device depending on the type of PBX 50 to which it is coupled.

Another non-IP network to which LANs 20 may be coupled is the Public Switched Telephone Network (PSTN) 60. PSTN 60 includes switching stations, central offices, mobile telephone switching offices, pager switching offices, remote terminals, and other related telecommunications equipment that are located across the country. For example, central offices (COs) 62 connect telephone customers, such as residences and businesses, to PSTN 60. In the illustrated embodiment, LANs 20 are coupled to selected central offices 62 through the use of gateway devices 24b and 24c. The operation of the gateway devices 24 in communication network 10 is described in further detail below.

Central offices 62 are coupled through a long distance network 66 that allows communication between residences and businesses coupled to central offices in different areas, such as central office 62a in Dallas and central office 62b in San Jose. The entity that owns the communication lines comprising long distance network 66 (there are typically several different entities, each having their own communication lines) charges a fee for the use of these lines. However, one advantage of IP telephony is that a company owning (or leasing) LANs 20 and WAN 30 may avoid such fees by using WAN 30 to transmit calls between LANs 20 in different areas. Internet 40 may also be used to transmit calls.

IP networks and other packet-based networks transmit data (including voice and video data) by placing the data in packets and sending each packet individually to the selected destination. Unlike a circuit-switched network (like PSTN 60), dedicated bandwidth is not required for the duration of a call or fax transmission over LANs 20, WAN 30 or Internet 40. Instead, each telephony device sends packets across the network as they become available for transmission. This feature makes bandwidth available for other data when voice or fax data is not being transmitted.

The technology that allows telecommunications to be transmitted over an IP network (as well as other packet-based networks) may be referred to as Voice over Packet (VoP). IP telephony devices 22 have the capability of encapsulating a user's voice (or other media inputs) into IP packets so that the voice can be transmitted over LANs 20, WAN 30 and/or Internet 40. IP telephony devices 22 may include telephones, fax machines, computers running telephony software (such as MICROSOFT NETMEETING), gateway devices, H.323-compatible devices, or any other device capable of performing telephony functions in an IP network.

Communication network 10 includes a plurality of call managers 26 that control one or more IP telephony devices 22. A call manager 26 is an application that controls call processing, routing, telephone features and options (such as call hold, call transfer and caller ID), device configuration, and other telephony functions and parameters within communication network 10. A call manager 26 can control one or more of the IP telephony devices 22 coupled to the same LAN 20 to which it is coupled, and a call manager 26 may also control IP telephony devices 22 located elsewhere in communications network 10. For example, call manager 26a is capable of controlling telephony devices on LAN 20b. A call manager 26 may be implemented as software executing on one or more computers coupled to communication network 10. The call manager software may be embodied in any type of computer-readable medium including, but not limited to, hard drives, diskettes, CD-ROMs, DVD-ROMs, or other optical or magnetic storage devices.

When an IP telephony device 22 is connected to a LAN or elsewhere in communication network 10 (or when it otherwise comes on-line), the telephony device 22 may be assigned an IP address using Dynamic Host Control Protocol (DHCP) or another similar protocol or technique. The telephony device 22 then registers with any call manager 26 with which it can communicate using its telephone number and its IP address. Alternatively, the telephony device 22 may request that it be assigned a telephone number and/or an IP address. The term "telephone number" should be understood to include any appropriate combination of digits or characters or any other appropriate method of identifying a telephony device. The telephony device may also report its Media Access Control (MAC) address and/or its device name. The call manager 26 with which a telephony device 22 has registered creates an internal device process, described below, that is used to route signaling to the telephony device 22 from call managers 26 or other telephony devices 22.

The ability of a call manager 26 to control any IP telephony device 22 in communication network 10 allows a call processing environment in which control of devices may distributed dynamically in response to changes in communication network 10. For example, if a call manager 26 goes off-line, the telephony devices 22 controlled by that call manager 26 can connect and register with an alternative call manager 26 in communication network 10. Likewise, if a communication link between a telephony device 22 and a call manager 26 goes down, the telephony device 22 may connect and register with an alternative call manager 26 to which there is an operable communication path. Furthermore, the distributed control of telephony devices 22 also provides for network scalability and load-sharing by allowing telephony devices 22 to be controlled by any call manager 26, regardless of physical location, in order to avoid excess load on a particular call manager 26 when new telephony devices 22 come on-line or to provide load balancing between call managers 26.

Figures 2, 3:
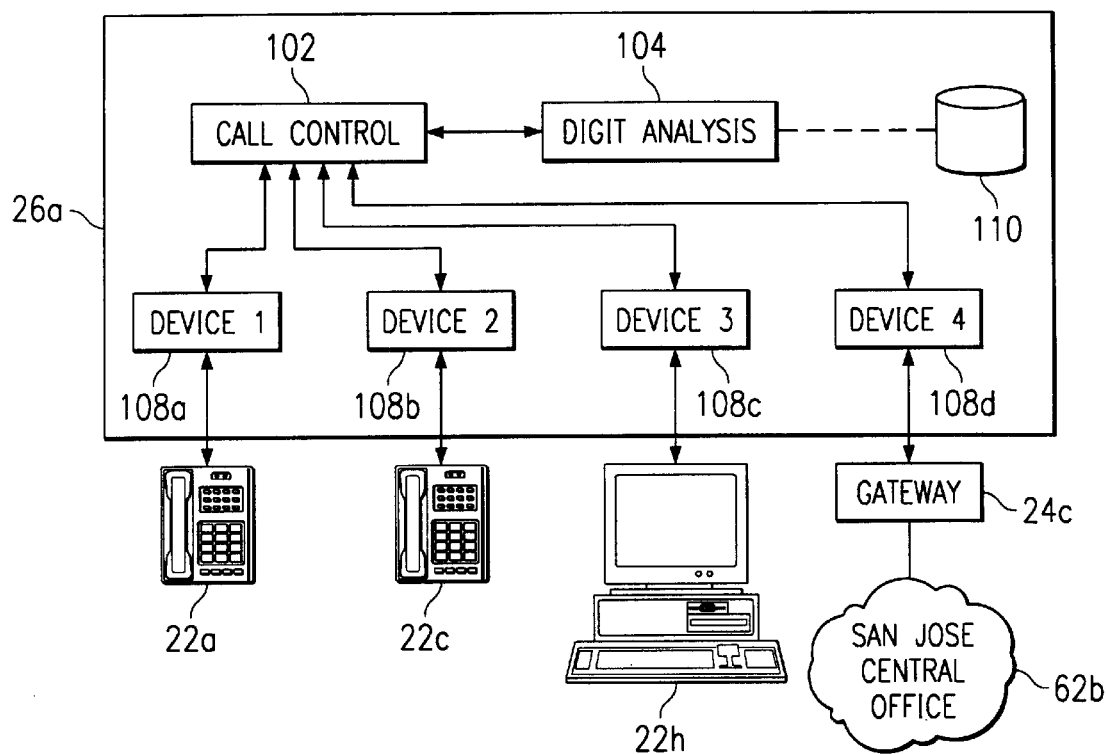
FIG. 2 illustrates an exemplary call manager in accordance with one embodiment of the present invention.
FIG. 3 illustrates an exemplary registration information table maintained by a call manager in accordance with one embodiment of the present invention.

FIG. 2 illustrates an exemplary call manager 26a. It should be understood that any appropriate combination of telephony devices 22 and/or gateway devices 24 in communication network 10 may be controlled by call manager 26a. In the illustrated embodiment, call manager 26a controls telephony devices 22a and 22c, which are coupled to LAN 20a, and telephony device 22h and gateway device 24c, which are coupled to LAN 20b.

Call manager 26a includes a number of internal processes that are used to manage and control communication to and from devices 22, 24. These processes include, but are not limited to, a call control module 102, a digit analysis module 104, and one or more device processes 108. Call control module 102 is responsible for establishing calls between multiple IP telephony devices 22 or between one or more IP telephony devices 22 and one or more external telephony devices, such as PBX telephony devices 54 and PSTN telephony devices 68.

In the illustrated embodiment, each device 22, 24 has an associated device process 108. Signaling to and from devices 22, 24 is first passed through the associated device process 108, which acts as a signaling contact point in call manager 26a to a device 22, 24. For example, signaling sent from call control module 102 of call manager 26a or signaling sent from another call manager 26 is directed to the appropriate device process 108, which then communicates the signaling to the appropriate device 22, 24. Likewise, signaling sent from a device 22, 24 is first sent to the associated device process 108, and is then communicated to the appropriate destination. Signaling between devices 22, 24 and between call managers may be performed using any appropriate signaling method including, but not limited to, Signal Distribution Layer (SDL) signaling links or tunneling trunks, as described below.

When a device 22, 24 coupled to a LAN 20 or any other appropriate location in communication network 10 comes on-line, the device 22, 24 registers with a call manager 26. As described above, a device 22, 24 can register with any call manager 26 with which the device 22, 24 can communicate by sending the call manager 26 a registration request. A call control module 102, or any other appropriate component of call manager 26, receives the registration requests. Call control module 102 (or another appropriate component) generates a device process 108 for the registering device 22, 24 and assigns the device process 108 a process identification number or string (PID).

Call control module 102 communicates the registering device's telephone number and the associated device process PID to digit analysis module 104. Digit analysis module 104 associates the telephone number and the PID in a registration information table 110 or any other appropriate database. Registration information table 110 may also include any other suitable registration information associated with the registering device 22, 24, such as the device name, IP address or MAC address of the device 22, 24.

When a device 22, 24 wishes to establish communications with another device in communication network 10, the device 22, 24 typically communicates one or more digits (or characters) to the call manager 26 controlling device 22, 24. The digits identify the device with which communication is requested. For the purposes of this description, the term 'telephone number' will be used to indicate any combination of digits or characters or any other type of information that identifies a device 22, 24, 54, 68 (or any other appropriate device not illustrated). For example, a telephony device 22 may send a call manager 26 one or more digits indicating the telephone number of an IP telephony device 22 or a non-IP telephony device (such as a PBX device 54 or a PSTN device 68) to initiate a telephone call with the device. Alternatively, a gateway device 24 may communicate one or more digits to a call manager 26 identifying an IP telephony device 22 with which a non-IP telephony device 54, 68 desires to communicate.

Digit inputs received by a call manager 26 are communicated to digit analysis module 104. Digit analysis module 104 may receive these digits directly from a device process 108, a call control module 102 (which received the digits from a device process 108) or any other suitable process in the same or a different call manager 26. Digit analysis module 104 translates the digit input it receives into the PID of the device process 108 that is associated with the device 22, 24 designated by the received digits. Digit analysis module 104 performs this translation using a table look-up in registration information table 110 or any other suitable process of determining the PID associated with the digits. The digits may be an internal telephone number (such a four-digit extension number), in which case the PID typically identifies a device process 108 associated with a telephony device 22. Alternatively, these digits may be an external telephone number (for example, a seven or ten digit North American Numbering Plan number or a PBX extension), in which case the PID may identify a device process 108 associated with a gateway device 24 or a process associated with a plurality of gateway devices 24. Digit analysis module 104 communicates the PID to the process that requested the digit analysis.

As an example, and not by way of limitation, assume that telephony device 22a communicates a call request including a digit string to device process 108a. The digit string is a telephone number of telephony device 22h. Device process 108a receives the digit string and communicates the digits to call control module 102. Call control module 102 communicates the digits to digit analysis module 104 to determine the PID of the device process 108 associated with the digits. Digit analysis module 104 performs a table look-up or any other suitable process of determining the PID associated with the digits (the PID of device process 108c) and communicates the PID to call control module 102. Call control module 102 may then communicate with device process 108c to initiate a call or other communication between telephony devices 22a and 22h, as is described below in further detail. It should be understood that the call request may include any other type of signal or indication from a device 22, 24 that it or another device desires to communicate with another device.

In the example above, the requested communication was between two telephony devices 22a and 22h controlled by call manager 26a. However, in many cases, devices 22, 24 controlled by different call managers 26 may wish to communicate. For example, due to the distributed nature of call managers 26 and the devices 22, 24 that they control, it is quite possible that two devices 22,24 operated by a business may be controlled by two different call managers 26 located across the country from one another. Therefore, the registration information table 110 in a call manager 26 should have not only the PIDs (or other appropriate registration information) of the device processes 108 associated with the devices 22, 24 that the call manager 26 controls (local devices), but also the PIDs of device processes 108 associated with devices 22, 24 controlled by other call managers 26 (remote devices) with which communication might be desired.

As devices 22, 24 come on-line, go off-line or switch call managers 26, the registration table 110 in each call manager 26 needs to be updated. For this reason, each call manager 26 periodically communicates the telephone numbers and associated PIDs of the devices 22, 24 it controls to each of the other call managers 26. Each call manager 26 adds this information to the local device registration information in its registration information table 110.

FIG. 3 illustrates an exemplary registration information table 110 maintained by call manager 26a. Table 110 contains a list of digit strings 112 in a left column and a list of respective PIDs 114 of device processes 108 in a right column. In the illustrated embodiment, digit strings 112 include both internal four-digit telephone numbers and external telephone numbers (for example, telephone numbers associated with telephony devices 54, 68). The external telephone numbers are designated in table 110 by the notation "9@" (indicating the number nine preceding any digit string). These external telephone numbers could also include any other appropriate format (for example, external calls could be designated as "xxx-xxxx", "xxx-xxx-xxxx" or any other appropriate dialing pattern).

In the illustrated embodiment, each PID 114 includes a node number (representing a call manager 26), a process name (identifying the type of process), and an instance number. For example, the PID '1.dp.3' may indicate the third device process 108 executing in the call manager 26 having a node number of '1'. Similarly, the PID '2.dp.1' indicates the first device process 108 executing in a second call manager having a node number of '2'. Although a particular type of PID 114 is illustrated, any other method of identifying a device process 108 in a call manager 26 may be used. In addition, other appropriate processes associated with devices 22, 24 may also be identified in registration information table 110.

A PID 114 enables a call control module 102 (or another appropriate process) in one call manager 26 to directly communicate with a device process 108 in the same (local) call manager 26 or another (remote) call manager 26 in order to establish communication between two devices 22, 24. Registration information table 110 may contain the PIDs of many different types of processes executing at multiple call managers. This PID information provides a location or address at which a process may be signaled, even if that process is at a different call manager than the process or other component that is sending the signal. As will be described below, using registration information table 110, a telephone number received from a device 22, 24 may be resolved at the call manager 26 receiving the telephone number into a PID of a device process 108 (or other type of process) associated with a device 22, 24 identified by the telephone number. The device process 108 may then be directly signaled even though it may be executing at another call manager.

However, if direct signaling to a remote device process 108 is not available, PIDs 114 of remote device processes 108 may be replaced with just the node number of the remote call manager 26 executing the remote device process 108. In this case, call control module 102 (or another appropriate process) signals the remote call manager 26 with the telephone number of the device 22, 24 with which communication is desired. The call manager receiving the signaling then communicates the telephone number to its local digit analysis module 104, which determines the appropriate local PID. The local digit analysis module 104 communicates the PID to the local call control module 102, which then initiates (or attempts to initiate) the desired communication between devices 22, 24.

Figure 4:
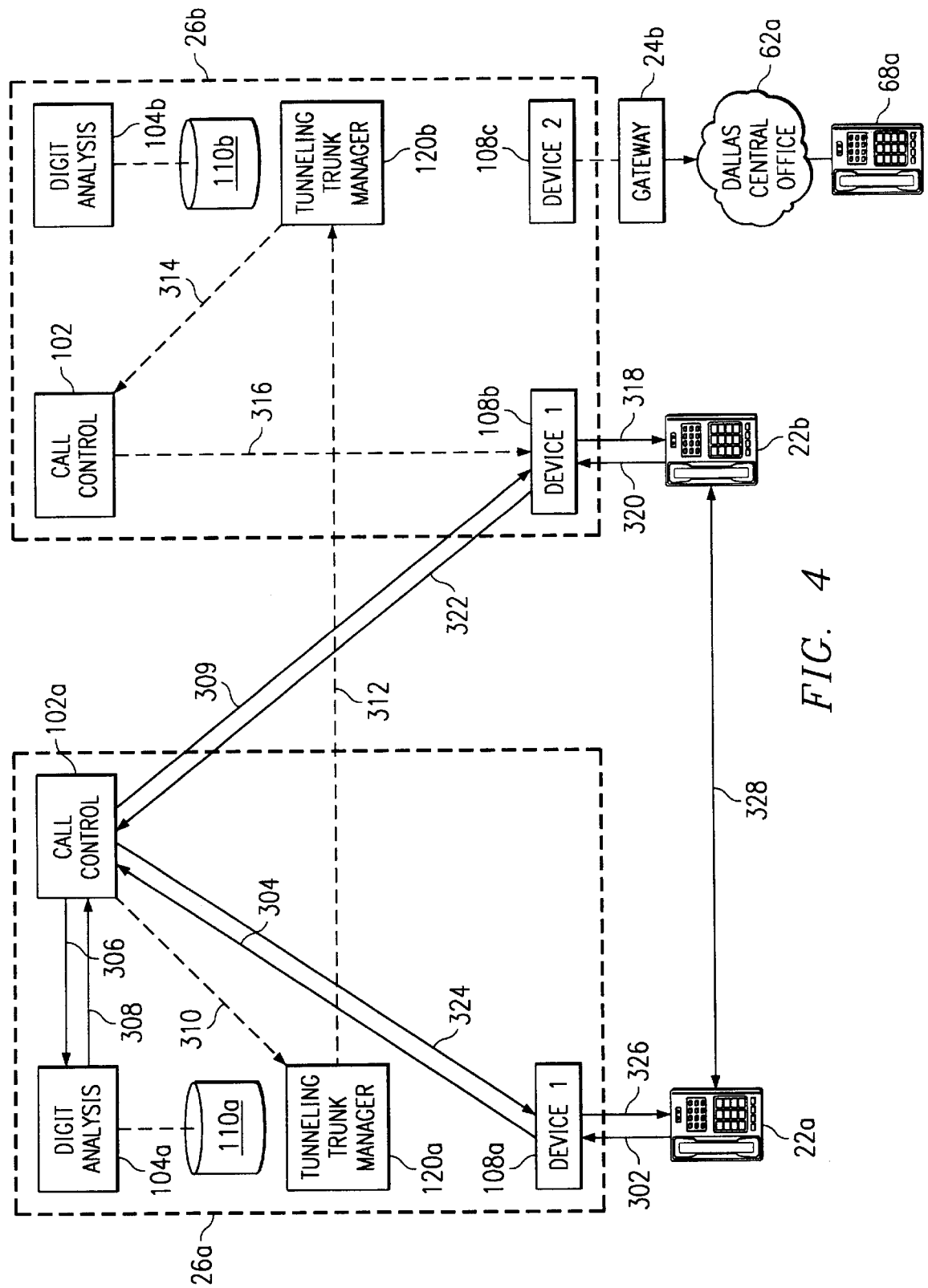
FIG. 4 illustrates an exemplary call routing process between call managers coupled to the communication network.

FIG. 4 illustrates an exemplary call routing process between call managers 26a and 26b in communication network 10. Although FIG. 4 illustrates call managers 26a and 26b and certain devices 22, 24 controlled by call managers 26a and 26b, it should be understood that this description applies to call routing between any devices 22, 24 controlled by any call manager(s) 26 in communication network 10. Furthermore, although FIG. 4 illustrates a series of communications between different modules or processes in call managers 26a and 26b, other appropriate intermediary modules or processes may be involved in these communications, and the functions of one or more of the described modules or processes may be divided between multiple components or combined in a single component.

When a user wishes to place a call from IP telephony device 22a to IP telephony device 22b in communications network 10, the calling telephony device 22a communicates a call request signal to its associated device process 108a executing in call manager 26a, as indicated by arrow 302. The call request signal indicates the telephone number of called telephony device 22b. Device process 108a communicates the call request to call control module 102a as indicated by arrow 304, and call control module 102a communicates the telephone number of called telephony device 22b to digit analysis module 104a as indicated by arrow 306. Call control module 102a may communicate the telephone number as a whole or it may communicate each digit of the telephone number successively. Digit analysis module 104a obtains device location information from registration information table 110a, and communicates this location information to call control module 102a, as indicated by arrow 308.

The type of location information that digit analysis module 104a communicates to call control module 102a depends on the signaling method used to communicate with device processes 108. As discussed above, if direct signaling between call control module 102a and device process 108b is used, then registration information table 110a includes a PID for device process 108b. In this case, digit analysis module 104a determines the PID associated with the telephone number in registration information table 110a (the PID of device process 108b) and communicates the PID to call control module 102a. Call control module 102a directly signals device process 108b with the call request (for example, using an SDL link), as indicated by arrow 309.

Alternatively, call control process 102a may communicate with call control process 102b using a tunneling trunk instead of communicating directly to device process 108b. This tunneling trunk may be, but is not limited to, a Transmission Control Protocol (TCP) or a User Datagram Protocol (UDP) connection between call manager 26a and call manager 26b. If a tunneling trunk is used, registration information table 110a associates the node number of call manager 26b (which may be included in a PID of device process 108b) with the telephone number of telephony device 22b. Digit analysis module 104a communicates the node number or complete PID to call control module 102a. As indicated by arrow 310, call control module 102a communicates the call request (including the node number or PID) to a tunneling trunk manager 120a that controls communication over the tunneling trunks connecting call manager 26a to the other call managers 26. Arrow 310 is dashed to indicate that the use of tunneling trunks is an alternative to direct signaling.

If the node number or PID indicates that the called device is controlled by call manager 26a (which is not the case in the illustrated embodiment), tunneling trunk manager 120 would return the call request to call control module 102a. Call control module 102a would signal the device process 108 associated with called telephony device 22b to indicate the call request from calling telephony device 22a.

If, as illustrated, the node number or PID indicates that called device 22b is remote from call manager 26a and controlled by call manager 26b, tunneling trunk manager 120a communicates the call request to a tunneling trunk manager 120b using a tunneling trunk set up between call managers 26a and 26b, as indicated by arrow 312. Tunneling trunk manager 120b communicates the call request to call control module 102b, as indicated by arrow 314. If a PID was communicated from call manager 26a (and thus the telephone number was resolved into the address of a device process 108 at call manager 26a), the PID is communicated to call control module 102b and the telephone number of telephony device 22b need not be sent from call manager 26a. Alternatively, if only a node number was communicated from call manager 26a, then call control module 102a may instruct tunneling trunk manager 120a to also send the telephone number of telephony device 22b to identify the telephony device 22 being called.

When call control module 102b receives the call request, call control module 102b either directly communicates with device process 108b based on a PID sent from call control module 102a, or call control module 102b communicates a telephone number sent by call manager 26a to digit analysis module 104b, which then returns the PID of device process 108b. Call control module 102b signals device process 108b to indicate the call request from calling telephony device 22a, as indicated by arrow 316.

Having received a call request signal from either call control module 102a or 102b (or from any other appropriate source) using either direct signaling or a tunneling trunk (or any other appropriate signaling method), device process 108b communicates the call request to called telephony device 22b, as indicated by arrow 318. If called telephony device 22b is available to communicate with calling telephony device 22a, called telephony device 22b communicates a call proceed signal to device process 108b, as indicated by arrow 320. The call proceed signal may be any appropriate communication that indicates a device's availability or desire to proceed with a communication. Device process 108b then communicates the call proceed signal to call control module 102a. Device process 108b may communicate this signal directly to call control module 102a using a direct signaling link, as indicated by arrow 322, or device process 108b may first communicate the signal to call control module 102b, which then communicates the signal to call control module 102a using the tunneling trunk, as described above.

Call control module 102a sets up the call by communicating the call proceed signal to device process 108a, as indicated by arrow 324. Device process 108a signals calling telephony device 22a, as indicated by arrow 326, and instructs telephony device 22a to establish media (audio and/or video) streaming with called telephony device 22b over a UDP connection, or any other suitable connection for transmitting media. A media streaming connection 328 may be directly between telephony devices 22a and 22b.

When media streaming connection 328 is established, the users of telephony devices 22a and 22b may begin to communicate. A codec (coder/decoder) in telephony devices 22a and 22b converts the media (for example, voice, video or fax) signals generated by the users of telephony devices 22a and 22b from analog signals into digitally encoded data. The codec may be implemented either in software or as special-purpose hardware in IP telephony devices 22a and 22b.

The digitally encoded data is encapsulated into IP packets so that it can be transmitted between telephony devices 22a and 22b. The encapsulation may be performed using Real-Time Transport Protocol (RTP) running over UDP, or any other suitable communication protocol. Once UDP has received and reassembled the IP packets at the destination telephony device 22, a codec in the destination telephony device 22 translates the digital data into analog audio and/or video signals for presentation to the user. The entire process is repeated each time that any call participant (or any other source) generates a media signal.

In addition to calls between IP telephony devices 22, calls can also be placed to and received from non-IP telephony devices 54, 68 that are connected to PBX 50, PSTN 60, or any other appropriate external network. Gateways 24 couple telephony devices 54, 68 to LANs 20 and convert analog or digital circuit-switched data transmitted from PBX 50 or PSTN 60 to packetized data transmitted by LANs 20, and vice-versa.

When a user of an IP telephony device 22a desires to place a call to an external telephony device, such as a PBX telephony device 54 or a PSTN telephony device 68, from IP telephony device 22a, calling telephony device 22a communicates a call request signal to its associated device process 108a. The call request signal indicates the telephone number of the called telephony device, for example PSTN telephony device 68a. As described above, device process 108a communicates the call request to call control module 102a, and call control module 102a communicates the telephone number of telephony device 68a to digit analysis module 104a.

Digit analysis module 104a communicates location information associated with the telephone number in registration information table 110a to call control module 102a. Since telephony device 68a is not an IP telephony device 22 controlled by a call manager 26, its telephone number (or a pattern including its telephone number, such as 'xxx-xxx-xxxx') may be associated in registration information table 110a with a process controlling one or more gateway devices 24 that provide access to PSTN 60. For example, the pattern '214-xxx-xxxx' (214 being an area code in Dallas) may be associated with the PID or node number of a device process 108c controlling gateway 24b. Gateway 24b provides access to Dallas central office 62a (to which telephony device 68a is coupled). Alternatively, the telephone number or pattern may be associated with a route list control process that controls multiple gateway devices 24 by acting as an intermediary between a call control module 102 and the device processes 108 controlling each gateway device 24.

Assuming the telephone number or extension indicated in the call request from telephony device 22a is directly associated with device process 108c controlling gateway 24b (for example, there is no intermediate route list control process), the PID (or associated node number) of device process 108c is communicated from digit analysis module 104a to call control module 102a. Call control module 102a signals device process 108c using direct signaling, a tunneling trunk, or any other appropriate signaling method to indicate the call request and the telephone number of telephony device 68a. Process 108c communicates with gateway 24b, and gateway 24b interfaces with central office 62a to determine whether telephony device 68a can accept the call. If telephony device can accept the call, gateway 24b communicates a call proceed signal (through device process 108c) to device process 108a using direct signaling, a tunneling trunk, or any other appropriate signaling method. Telephony device 22a establishes a media streaming connection with gateway device 24b using UDP/IP or any other appropriate method.

As described above, a codec in telephony device 22a converts the media signals generated by the user of telephony device 22a from analog signals into digital encoded data. The digitally encoded data is encapsulated into IP packets. The IP packets are communicated to gateway device 24b and gateway device 24b converts the digital data to the analog or digital format used by the PSTN trunk to which gateway device 24b is coupled. Gateway device 24b signals central office 62a to direct the media from telephony device 22a to telephony device 68a. For media transmissions from PSTN telephony device 68a to IP telephony device 22a, the process is reversed. Gateway device 24b receives the incoming media transmissions (in either analog or digital form) and converts them into the digital format used for communications over LAN 20a. The digital data is then encapsulated into IP packets and transmitted over LAN 20a to IP telephony device 22a.

A similar process to that described above is used when a call is placed from PSTN telephony device 68a (or any other non-IP telephony device) to IP telephony device 22a. In this case, a user of telephony device 68a dials a telephone number that is associated in central office 62a with gateway device 24b. For example, the digit pattern '214-555-xxxx' may be associated with gateway 24b (where 'xxxx' represents the extensions of one or more IP telephony devices 22). If telephony device 68a dials '214-555-1001', then central office 62a connects telephony device 68a with gateway 24b. Gateway 24b communicates the call request (including the telephone number dialed by the user of telephony device 68a, which gateway device 24b may or may not truncate to leave only the last four digits) to its device process 108c.

Device process 108c communicates the call request to call control module 102b, and call control module 102b communicates the telephone number to digit analysis module 104b. Digit analysis module 104b communicates location information for device process 108a that is associated with the telephone number to call control module 102b. Call control module 102b communicates the call request to device process 108a (through direct signaling, a tunneling trunk, or any other appropriate method), and device process 108a communicates the call request to telephony device 22a. If telephony device 22a accepts the call by sending a call proceed signal, media streaming is set up between telephony device 22a and gateway device 24b, and the call proceeds as described above (with gateway device 24b acting as an intermediary between telephony devices 22a and 68a).

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for distributed call routing, comprising:
    receiving a call request at a first call manager from a first device coupled to a packet-based network, the call request including a telephone number associated with a second device coupled to the packet-based network and controlled by a second call manager;
    determining by the first call manager that the second device is controlled by the second call manager by obtaining device location information associated with the telephone number included in the call request, the device location information comprising a node number of the second call manager used to communicate with the second call manager via a tunneling trunk between the first call manager and the second call manager or a process identification (PID) of a process device executing in the second call manager and controlling the second device;
    communicating the call request to the second call manager; and
    receiving a call proceed signal from the second call manager.

2. The method of claim 1, wherein receiving a call request at a first call manager from a first device comprises receiving a call request from an IP telephony device, the call request originating from the IP telephony device.

3. The method of claim 1, wherein receiving a call request at a first call manager from a first device comprises receiving a call request from a gateway device, the call request originating from a non-IP telephony device coupled to the gateway device.

4. The method of claim 1, wherein receiving a call request at a first call manager from a first device comprises receiving a call request from the first device including a telephone number associated with an IP telephony device controlled by the second call manager.

5. The method of claim 1, wherein receiving a call request at a first call manager from a first device comprises receiving a call request from the first device including a telephone number associated with a gateway device controlled by the second call manager, the telephone number identifying a non-IP telephony device coupled to the gateway device.

6. The method of claim 5, wherein receiving a call request from the first device including a telephone number associated with a gateway device comprises receiving a call request from the first device including a telephone number included in a telephone number pattern associated with the gateway device.

7. The method of claim 1, wherein the device location information associated with the telephone number included in the call request is obtained from a registration information table stored by the first call manager.

8. The method of claim 1, wherein communicating the call request to the second call manager comprises communicating the call request over the tunneling trunk between the first call manager and the second call manager identified by the node number.

9. The method of claim 1, further comprising:
    determining by the second call manager a PID identifying a device process controlling the second device and executing in the second call manager;
    communicating the call request to the device process;
    communicating the call request to the second device from the device process; and
    receiving a call proceed signal from the second device indicating acceptance of the call request.

10. The method of claim 1, wherein communicating the call request to the second call manager comprises communicating the call request directly to the device process identified by the PID.

11. The method of claim 1, further comprising:
    communicating the call request from the device process to the second device; and receiving a call proceed signal from the second device indicating acceptance of the call request.

12. The method of claim 1, further comprising establishing media streaming between the first device and the second device in response to receiving the call proceed signal from the second call manager.

13. A system for distributed call routing, comprising:
a packet-based network;
a plurality of devices coupled to the packet-based network; and
a first call manager and a second call manager coupled to the packet-based network, the first and second call managers each controlling one or more of the devices;
the first call manager operable to;
receive a call request from a first device controlled by the first call manager, the call request including a telephone number associated with a second device controlled by the second call manager;
determine device location information associated with the telephone number, the device location information comprising a node number of the second call manager used to communicate with the second call manager via a tunneling trunk between the first call manager and the second call manager or a process identification (PID) of a device process executing in the second call manager and controlling the second device; and
communicate the call request to the second call manager;
the second call manager operable to receive the call request from the first call manager and to communicate the call request to the second device, the second call manager further operable to receive a call proceed signal from the second device and to communicate the call proceed signal to the first call manager.

14. The system of claim 13, wherein the first device comprises an IP telephony device operable to originate the call request.

15. The system of claim 13, wherein the first device comprises a gateway device operable to communicate the call request from a non-IP telephony device coupled to the gateway device.

16. The system of claim 13, wherein the second device comprises an IP telephony device.

17. The system of claim 13, wherein the second device comprises a gateway device coupling a non-IP telephony device to the packet-based network.

18. The system of claim 13, wherein the first call manager comprises:
a first device process controlling the first device and operable to receive the call request from the first device;
a first digit analysis module operable to determine device location information associated with the telephone number included in the call request; and
a first call control module operable to receive the device location information from the digit analysis module and to communicate the call request to the second call manager in response to receiving the device location information.

19. The system of claim 18, wherein:
the first call manager further comprises a registration information table associating telephone numbers with device location information; and
the first digit analysis module is operable to access the registration information table to determine the device location information associated with the telephone number included in the call request.

20. The system of claim 13, wherein the first call control module is operable to communicate the call request directly to the second device process using the PID.

21. The system of 13, wherein the first call control module is operable to communicate the call request to the second call manager using the tunneling trunk.

22. The system of claim 21, wherein the second call manager comprises:
a second call control module operable to receive the call request from the first call control module;
a second digit analysis module operable to receive from the second call control module the telephone number included in the call request and further operable to determine a PID of a device process associated with the telephone number and to communicate the PID to the second call control module to allow the second call control module to communicate the call request to the device process controlling the second device; and
a second device process controlling the second device and operable to receive the call request from the second call control module, and farther operable to communicate the call request to the second device and to receive a call proceed signal from the second device.

23. The system of claim 22, wherein:
the first call manager further comprises a first tunneling trunk manager operable to communicate signals between the tunneling trunk and the first call control module; and
the second call manager further comprises a second tunneling trunk manager operable to communicate signals between the tunneling trunk and the second call control module.

24. A first call manager, comprising:
a device process controlling a first device and operable to receive a call request from the first device, the call request including a telephone number associated with a second device controlled by a second call manager;
a digit analysis module operable to determine device location information associated with the telephone number included in the call request, the device location information comprising a node number of the second call manager used to communicate with the second call manager via a tunneling trunk between the first call manager and the second call manager or a process identification (PID) of a process device executing in the second call manager and controlling the second device; and
a call control module operable to receive the device location information from the digit analysis module and to communicate the call request to the second call manager identified by the device location information.

25. The first call manager of claim 24, further comprising a registration information table associating telephone numbers with device location information, the digit analysis module operable to access the registration information table to determine the device location information associated with the telephone number included in the call request.

26. The first call manager of claim 24, wherein the call control module is operable to communicate the call request directly to the second device process using the PID.

27. The first call manager of claim 24, wherein the call control module communicates the call request to the second call manager using the tunneling trunk.

28. The first call manager of claim 27, further comprising a tunneling trunk manager operable to communicate signals between the tunneling trunk and the call control module.

29. First call manager software embodied in a computer-readable medium and operable to perform the following steps:

receiving a call request from a first device coupled to a packet-based network and controlled by the first call manager software, the call request including a telephone number associated with a second device coupled to the packet-based network and controlled by a second call manager software;

determining that the second device is controlled by the second call manager software by obtaining device location information associated with the telephone number included in the call request, the device location information comprising a node number of the second call manager software used to communicate with the second call manager software via a tunneling trunk between the first call manager software and the second call manager software or a process identification (PID) of a process device executing in the second call manager software and controlling the second device;

communicating the call request to the second call manager software; and receiving a call proceed signal from the second call manager software.

30. The first call manager software of claim 29, wherein receiving a call request from a first device comprises receiving a call request from an IP telephony device, the call request originating from the IP telephony device.

31. The first call manager software of claim 29, wherein receiving a call request from a first device comprises receiving a call request from a gateway device, the call request originating from a non-IP telephony device coupled to the gateway device.

32. The first call manager software of claim 29, wherein receiving a call request from a first device comprises receiving a call request from the first device including a telephone number associated with an IP telephony device controlled by the second call manager software.

33. The first call manager software of claim 29, wherein receiving a call request from a first device comprises receiving a call request from the first device including a telephone number associated with a gateway device controlled by the second call manager software, the telephone number identifying a non-LP telephony device coupled to the gateway device.

34. The first call manager software of claim 33, wherein receiving a call request from the first device including a telephone number associated with a gateway device comprises receiving a call request from the first device including a telephone number included in a telephone number pattern associated with the gateway device.

35. The first call manager software of claim 29, wherein the device location information associated with the telephone number included in the call request is obtained from a registration information table.

36. The first call manager software of claim 29, wherein communicating the call request to the second call manager software comprises communicating the call request over the tunneling trunk between the first call manager software and the second call manager software identified by the node number.

37. The first call manager software of claim 29, wherein communicating the call request to the second call manager software comprises communicating the call request directly to the device process identified by the PID.

38. The first call manager software of claim 29, further comprising establishing media streaming between the first device and the second device in response to receiving the call proceed signal from the second call manager software.

39. A first call manager, comprising:

means for receiving a call request from a first device coupled to a packet-based network and controlled by the first call manager, the call request including a telephone number associated with a second device coupled to the packet-based network and controlled by a second call manager;

means for determining that the second device is controlled by the second call manager by obtaining device location information associated with the telephone number included in the call request, the device location information comprising a node number of the second call manager used to communicate with the second call manager via a tunneling trunk between the first call manager and the second call manager or a process identification (PID) of a process device executing in the second call manager and controlling the second device;

means for communicating the call request to the second call manager; and means for receiving a call proceed signal from the second call manager.

40. The first call manager of claim 39, further comprising means for receiving a call request from an IP telephony device, the call request originating from the IP telephony device.

41. The first call manager of claim 39, further comprising means for receiving a call request from a gateway device, the call request originating from a non-IP telephony device coupled to the gateway device.

42. The first call manager of claim 39, further comprising means for receiving a call request from the first device including a telephone number associated with an IP telephony device controlled by the second call manager.

43. The first call manager of claim 39, further comprising means for receiving a call request from the first device including a telephone number associated with a gateway device controlled by the second call manager, the telephone number identifying a non-IP telephony device coupled to the gateway device.

44. The first call manager of claim 43, further comprising means for receiving a call request from the first device including a telephone number included in a telephone number pattern associated with the gateway device.

45. The first call manager of claim 39, further comprising means for obtaining device location information associated with the telephone number included in the call request from a registration information table.

46. The first call manager of claim 39, further comprising means for communicating the call request over the tunneling trunk between the first call manager and the second call manager identified by the node number.

47. The first call manager of claim 39, further comprising means for communicating the call request directly to the device process identified by the PID.

48. The first call manager of claim 39, further comprising means for establishing media streaming between the first device and the second device in response to receiving the call proceed signal from the second call manager.

* * * * *

UNITED STATES PATENT AND TRADEMARK OFFICE
CERTIFICATE OF CORRECTION

PATENT NO. : 6,847,634 B1 Page 1 of 1
DATED : January 25, 2005
INVENTOR(S) : Christopher E. Pearce et al.

It is certified that error appears in the above-identified patent and that said Letters Patent is hereby corrected as shown below:

<u>Column 13,</u>
Line 14, after "to" delete ";" and insert -- : --.

<u>Column 14,</u>
Line 6, after "of" insert -- Claim --.
Line 22, after "and" delete "farther" and insert -- further --.

Signed and Sealed this

Second Day of May, 2006

JON W. DUDAS
*Director of the United States Patent and Trademark Office*